(12) United States Patent
Hanita

(10) Patent No.: US 9,428,221 B2
(45) Date of Patent: Aug. 30, 2016

(54) DRIVE ASSIST CONTROL DEVICE

(75) Inventor: Kiyoto Hanita, Susono (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 1 day.

(21) Appl. No.: 14/402,961

(22) PCT Filed: May 23, 2012

(86) PCT No.: PCT/JP2012/063204
§ 371 (c)(1),
(2), (4) Date: Nov. 21, 2014

(87) PCT Pub. No.: WO2013/175593
PCT Pub. Date: Nov. 28, 2013

(65) Prior Publication Data
US 2015/0109119 A1 Apr. 23, 2015

(51) Int. Cl.
*B62D 15/02* (2006.01)
*B60K 28/06* (2006.01)

(52) U.S. Cl.
CPC .......... *B62D 15/029* (2013.01); *B60K 28/066* (2013.01); *B62D 15/0245* (2013.01); *B60W 2540/18* (2013.01)

(58) Field of Classification Search
CPC B62D 15/021; B62D 15/024; B62D 15/029; B62D 15/0245; B60W 2540/18; B60W 40/072
See application file for complete search history.

(56) References Cited

U.S. PATENT DOCUMENTS

| 6,470,241 B2 * | 10/2002 | Yoshikawa | B60K 28/066 701/1 |
| 7,481,294 B2 * | 1/2009 | Fujita | B62D 15/0245 180/446 |
| 8,260,501 B2 * | 9/2012 | Nakagoshi | B60W 40/08 180/272 |
| 2001/0003436 A1 | 6/2001 | Yoshikawa | |
| 2002/0016657 A1 * | 2/2002 | Iwazaki | B62D 1/28 701/41 |
| 2005/0128092 A1 | 6/2005 | Bukman et al. | |
| 2006/0070794 A1 * | 4/2006 | Fujita | B62D 15/0245 180/446 |
| 2009/0048737 A1 * | 2/2009 | Nakagoshi | B60W 40/08 701/43 |

FOREIGN PATENT DOCUMENTS

| JP | 11-208306 A | 8/1999 |
| JP | 3482166 B2 | 12/2003 |
| JP | 2007-514467 A | 6/2007 |
| JP | 2009-73462 A | 4/2009 |

\* cited by examiner

*Primary Examiner* — Van Trieu
(74) *Attorney, Agent, or Firm* — Sughrue Mion, PLLC

(57) ABSTRACT

A drive assist control device includes a steering determination unit 21 that determines a steering state of a vehicle, a curved state estimation unit 22 that estimates a curved state of a traveling road where the vehicle is traveling, a threshold value setting unit 23 that, in a case where it is determined by the steering determination unit 21 that a steering occurs after a steering wheel stationary state, sets a determination threshold value at the time of steering ts based on the curved state estimated during a period ts to ts+Tc from the time of steering ts to the set time Tc after the time of steering ts or a period ts−Tc to ts from the set time Tc before the time of steering ts to the time of steering ts and which is sharper than the curved state estimated at the time of steering ts, and a warning control unit 25 that actuates a warning in a case where the steering speed at the time of steering ts exceeds the determination threshold value.

4 Claims, 5 Drawing Sheets

(a)

(b)

DRIVE ASSIST CONTROL DEVICE

CROSS REFERNCE RELATED APPLICATIONS

This application is a National Stage of International Application No. PCT/JP2012/063204 filed May, 23, 2012, the contents of which are incorporated herein by reference in their entirety.

TECHNICAL FIELD

The present invention relates to a drive assist control device.

BACKGROUND ART

In the related art, as disclosed in CT Japanese Translation Patent Publication No. 2007-514467, a device is known, in which, in a case where it is determined that steering occurs after the steering wheel stationary state and an amount of steering at the time of steering exceeds a determination threshold value, a driver's carelessness is identified and a warning is emitted.

CITATION LIST

Patent Literature

[Patent Literature 1] PCT Japanese Translation Patent Publication No. 2007-514467

SUMMARY OF INVENTION

Technical Problem

However, a steering state (a steering speed) associated with a driver's intentional steering varies according to the shape of a traveling road where a vehicle is traveling, and thus, a steering speed increases as a sharpness of the curved state of the traveling road increases at a constant vehicle speed. For this reason, when the steering speed is determined based on the same determination threshold value on a straight road and on a curved road, there is a case where a sudden steering associated with the driver's carelessness cannot be appropriately identified to actuate a warning.

Therefore, an object of the present invention is to provide a drive assist control device in which the sudden steering associated with the driver's carelessness can be appropriately identified to actuate the warning.

Solution to Problem

A drive assist control device in the present invention includes: a steering determination unit that determines a steering state of a vehicle; a curved state estimation unit that estimates a curved state of a traveling road where the vehicle is traveling; a threshold value determination unit that, in a case where it is determined by the steering determination unit that a steering occurs after a steering wheel stationary state, sets a determination threshold value at the time of steering based on the curved state estimated during a period from the time of steering to the set time after the time of steering or a period from the set time before the time of steering to the time of steering and which is sharper than the curved state estimated at the time of steering; and a warning control unit that actuates a warning in a case where the steering speed at the time of steering exceeds the determination threshold value. Here, the threshold value determination unit estimates a radius of curvature or curvature of the traveling road as the curved state of the traveling road.

According to the drive assist control device in the present invention, in a case where it is determined that the steering occurs after the steering wheel stationary state and the steering speed at the time of steering exceeds the determination threshold value set based on the curved state of the traveling road, the warning is actuated. Accordingly, compared to the case where the steering speed is determined based on the same determination threshold value on the straight road and on the curved road, it is possible to appropriately identify the sudden steering associated with the driver's carelessness and to actuate the warning.

Here, the determination threshold value at the time of steering is set based on the curved state estimated during the period from the time of steering to the set time after the time of steering or a period from the set time before the time of steering to the time of steering and which is sharper than the curved state estimated at the time of steering. In this way, even in a case where it is determined that the steering occurs in the section where the curved state of the traveling road is relatively gradual (the entrance section or the exit section of the curved road), the determination threshold value (which is relatively large) is set based on the curved state sharper than the curved state estimated at the time of steering. Accordingly, compared to the case where the determination threshold value is set based on the curved state estimated at the time of steering and the steering speed is determined, it is possible to appropriately identify a sudden steering associated with the driver's carelessness and to actuate a warning.

In addition, in a case where it is determined that the steering occurs, the threshold value setting unit may set the determination threshold value at the time of steering based on the curved state estimated during a period from the set time before the time of steering to the set time after the time of steering and which is sharper than the curved state estimated at the time of steering. In this way, it is possible to appropriately set the determination threshold value regardless of the entrance section and the exit section of the curved road.

In addition, the threshold value setting unit may set the determination threshold value at the time of steering based on the sharpest curved state estimated during the above-described period. In this way, compared to the case where the determination threshold value is set based on the curved state at the time of steering and the steering speed is determined, it is possible to appropriately identify a sudden steering associated with the driver's carelessness and to actuate a warning.

Advantageous Effects of Invention

According to a drive assist control device in the present invention, it is possible to provide a drive assist control device in which a sudden steering associated with the driver's carelessness can be appropriately identified, and to actuate a warning.

DESCRIPTION OF EMBODIMENT

Figure 1:
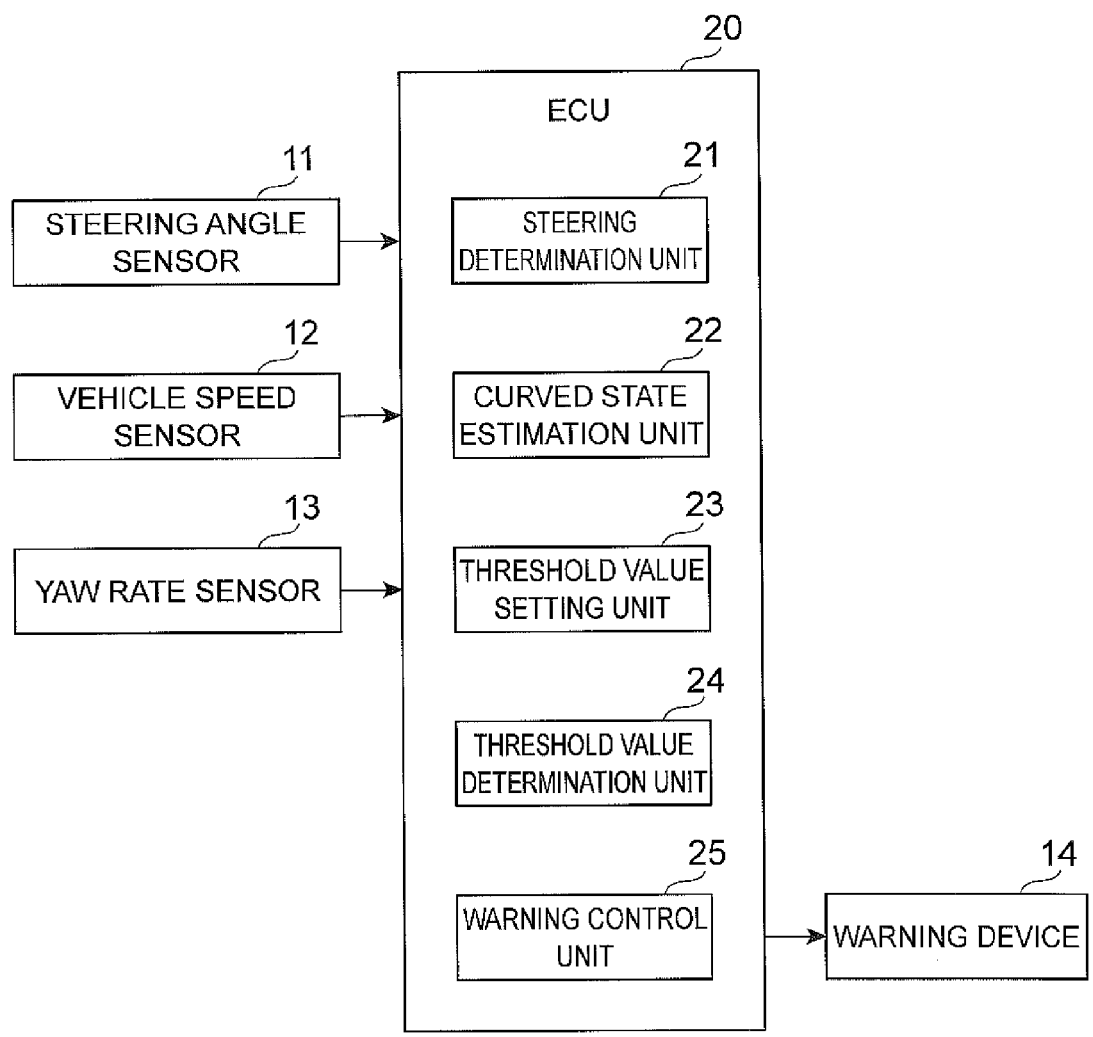
FIG. 1 is a block diagram illustrating a configuration of a drive assist control device in an embodiment of the present invention.

Hereinafter, an embodiment of the present invention will be described in detail referring to the drawings. In the description, the same reference signs are given to the same elements and the description will not be repeated.

A configuration of the drive assist control device in the embodiment of the present invention will be described referring to FIG. 1. FIG. 1 is a block diagram illustrating a configuration of a drive assist control device in the embodiment of the present invention.

The drive assist control device is a device mounted on a vehicle and appropriately identifies a sudden steering associated with a driver's carelessness and actuates a warning. As illustrated in FIG. 1, the drive assist control device is an electronic control unit (ECU) 20 that is respectively connected to a steering angle sensor 11, a vehicle speed sensor 12, a yaw rate sensor 13, and a warning device 14.

The steering angle sensor 11 is a sensor that detects a steering angle of the vehicle. A steering sensor or the like is used as the steering angle sensor 11. The steering angle sensor 11 detects a steering angle of a steering wheel and supplies a detection result to the ECU 20. Instead of the steering angle sensor 11, a torque sensor that detects a steering force used in a motor driven power steering may be used.

The vehicle speed sensor 12 is a sensor that detects a speed of the vehicle. A wheel speed sensor or the like is used as the vehicle speed sensor 12. The vehicle speed sensor 12 detects the speed of the vehicle and supplies the detection result to the ECU 20.

The yaw rate sensor 13 is a sensor that detects a yaw rate of the vehicle. A gyro-sensor or the like is used as the yaw rate sensor 13. The yaw rate sensor 13 detects a rotational angular velocity of the vehicle while turning, and supplies the detection result to the ECU 20.

The warning device 14 is a device that emits a warning to the driver. A display, a speaker, an LED, or a vibrator is used as the warning device 14. The warning device 14 emits a warning by visual information, auditory information, or tactile information based on a control signal supplied from the ECU 20.

The ECU 20 includes a steering determination unit 21, a curved state estimation unit 22, a threshold value setting unit 23, a threshold value determination unit 24, and a warning control unit 25. The ECU 20 is mainly formed of a CPU, a ROM, and a RAM, and the CPU reads out a program from the ROM and executes the program on the RAM, and thus, the functions of the steering determination unit 21, the curved state estimation unit 22, the threshold value setting unit 23, the threshold value determination unit 24, and the warning control unit 25 are realized. The functions of the steering determination unit 21, the curved state estimation unit 22, the threshold value setting unit 23, the threshold value determination unit 24, and the warning control unit 25 may be realized by two or more ECUs.

The steering determination unit 21 is configured so as to determine a steering state of the vehicle. Particularly, the steering determination unit 21 determines an occurrence of the steering after a steering wheel stationary state. The steering determination unit 21 determines the occurrence of the steering at the steering wheel stationary state and thereafter based on a steering speed, and supplies the detection result to the threshold value setting unit 23 and the threshold value determination unit 24.

The curved state estimation unit 22 is configured so as to estimate the curved state of the traveling road where the vehicle is traveling. The curved state estimation unit 22, for example, estimates the curved state of the traveling road based on the vehicle speed and the yaw rate, and supplies the estimation result to the threshold value setting unit 23. In the present embodiment, a case is assumed where the curved state of the traveling road is estimated as a radius of curvature of the traveling road, however, the curved state of the traveling road may be estimated as the curvature of the traveling road. The estimation result is accumulated in a memory which is not illustrated or the like over a predetermined time in order to set a determination threshold value.

The threshold value setting unit 23 is configured so as to set the determination threshold value at the time of steering. The determination threshold value is a threshold value for determining whether or not to actuate the warning with respect to a sudden steering associated with the driver's carelessness (inattention, drowsiness, diminished consciousness, or the like), and is set as the steering speed occurring at the time of sudden steering. The threshold value setting unit 23 sets the determination threshold value based on the estimation result of the curved state and supplies the determination threshold value to the threshold value determination unit 24.

Here, in a case where it is determined that the steering occurs after the steering wheel stationary state, the threshold value setting unit 23 sets the determination threshold value at the time of steering based on the curved state estimated during a period from the time of steering to the set time after the time of steering or a period from the set time before the time of steering to the time of steering and which is, at least, sharper than the curved state estimated at the time of steering. Particularly, it is preferable that the threshold value setting unit 23 set the determination threshold value at the time of steering based on the sharpest curved state estimated during the above-described period. The set time is, for example, set as the time of approximately one second, and may be set as the same time before and after the time of steering or may be set as the time different from that before and after the time of steering.

Alternatively, the threshold value setting unit 23 may set the determination threshold value at the time of steering based on the curved state estimated during the period from the set time before the time of steering to the set time after the time of steering and which is sharper than the curved state estimated at the time of steering, and particularly, based on the sharpest curved state estimated during the above-described period.

The threshold value determination unit 24 is configured so as to determine whether or not the steering speed at the time of steering after the steering wheel stationary state exceeds the determination threshold value. That is, the threshold value determination unit 24 determines whether or not steering after the steering wheel stationary state is a sudden steering associated with the driver's carelessness. The threshold value determination unit 24 compares the steering speed at the time of steering and the determination threshold value and supplies the comparison result to the warning control unit 25.

The warning control unit 25 is configured so as to actuate a warning with respect to the sudden steering associated with the driver's carelessness. In a case where it is determined that the steering speed at the time of steering exceeds the determination threshold value, the warning control unit 25 outputs a control signal for operating the warning device 14.

Figure 2:
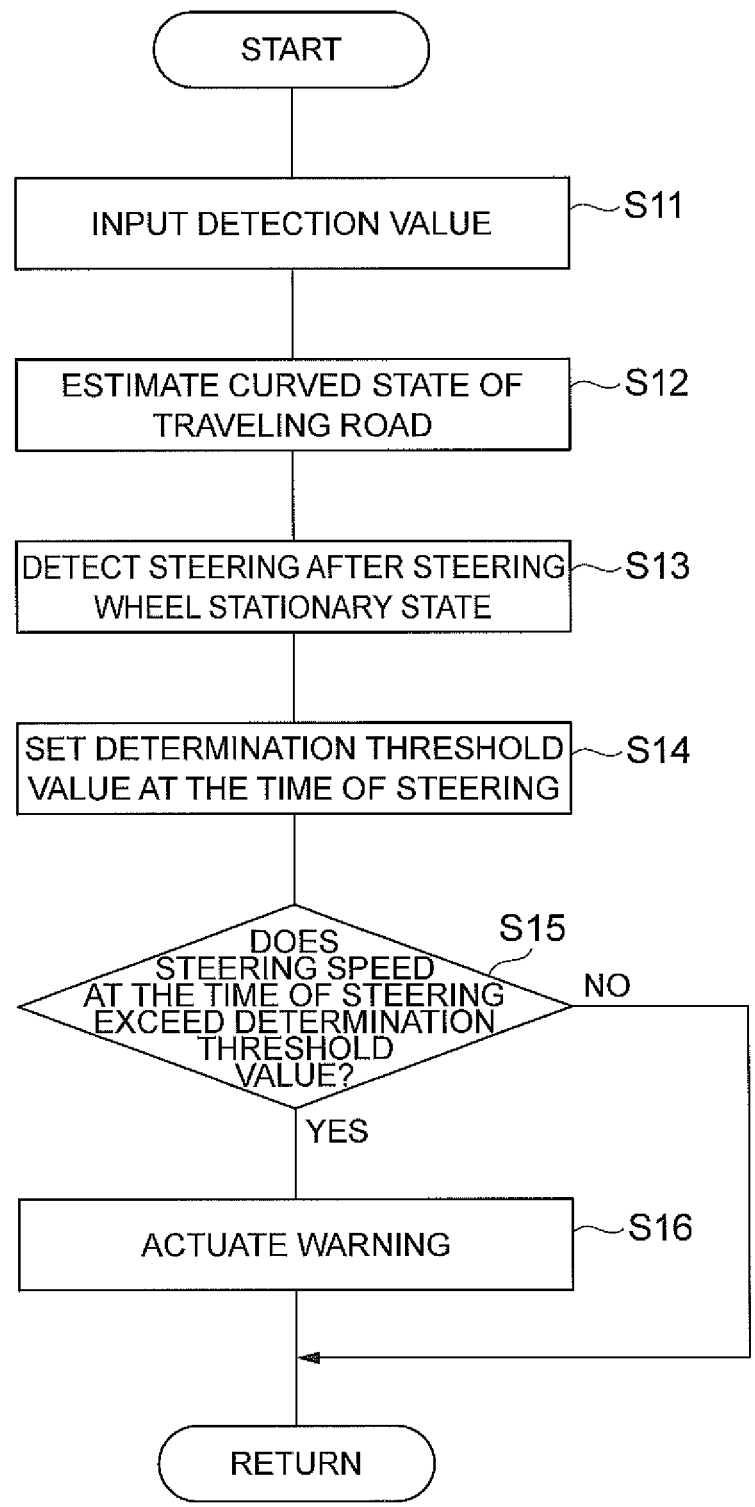
FIG. 2 is a flow chart illustrating an operation of the drive assist control device illustrated in FIG. 1.

Next, an operation of the drive assist control device in FIG. 1 will be described referring to FIG. 2 to FIG. 5. FIG. 2 is a flow chart illustrating an operation of the drive assist control device illustrated in FIG. 1. The drive assist control device repeatedly executes the processing illustrated in FIG. 2 in a predetermined processing period.

As illustrated in FIG. 2, detection values of a steering angle, the vehicle speed, and the yaw rate are input to the ECU 20 from the steering angle sensor 11, the vehicle speed sensor 12, and the yaw rate sensor 13, respectively (STEP S11).

The curved state estimation unit 22 estimates the curved state of the traveling road based on the detection values of the vehicle speed and the yaw rate (S12). For example, using a detection value of the vehicle speed (V) and a detection value of the yaw rate ($\gamma$), the radius of curvature is estimated as a value V/$\gamma$ and the curvature is estimated as a value $\gamma$/V. The estimation value of the curved state is accumulated over a predetermined time.

The steering determination unit 21 determines whether or not the steering after the steering wheel stationary state occurs based on the detection value of the steering angle (S13). The steering wheel stationary state is a state where the steering wheel is substantially in the stationary state while being in a straight forwarding state or a state where the steering wheel is substantially in the stationary state while being in a turned state, for example, and is determined as the state where the steering speed is lower than the predetermined threshold value over a predetermined time. The occurrence of the steering after the steering stationary state is determined to be within a predetermined time after the determination of the steering wheel stationary state.

The threshold value setting unit 23 sets the determination threshold value at the time of steering based on the estimation value of the curved state (S14). The determination threshold value is set as a functional value of the curved state, for example, is set as a value $\alpha$/R using an arbitrary constant ($\alpha$) and the estimation value of the radius of curvature (R) or the curvature (1/R). The threshold value setting unit 23 sets the determination threshold value at the time of steering while traveling the curved road based on the accumulated estimation value of the curved state as described below. Here, the determination threshold value at the time of steering ts is set as described below using the set time Tc (for example, a time of approximately one second).

The determination threshold value at the time of steering ts is, of the estimation value of the curved state in the period from the time ts to the time ts+Tc or in the period from the time ts−Tc to the time ts, set based on the estimation value sharper than the estimation value at the time of steering ts. Particularly, it is preferable that the determination threshold value be set based on the sharpest estimation value during the period. That is, in a case where the curved state is expressed using the radius of curvature, the determination threshold value is set based on the estimation value less than the estimation value at the time of steering ts, particularly, based on the minimum estimation value during the period.

On the other hand, in a case where the curved state is expressed using the curvature, the determination threshold value is set based on the estimation value greater than the estimation value at the time of steering ts, particularly, based on the maximum estimation value during the period.

Specifically, at the entrance section of the curved road, the determination threshold value is set based on the estimation value during the period from the time ts to the time ts+Tc, and at the exit section of the curved road, the determination threshold value is set based on the estimation value during the period from the time ts−Tc to the time ts. Whether or not the vehicle is traveling at the entrance section or the exit section of the curved road is determined based on the variation of the detection value of the vehicle speed or the yaw rate, or on the variation of the estimation value of the curved state.

Figure 3:
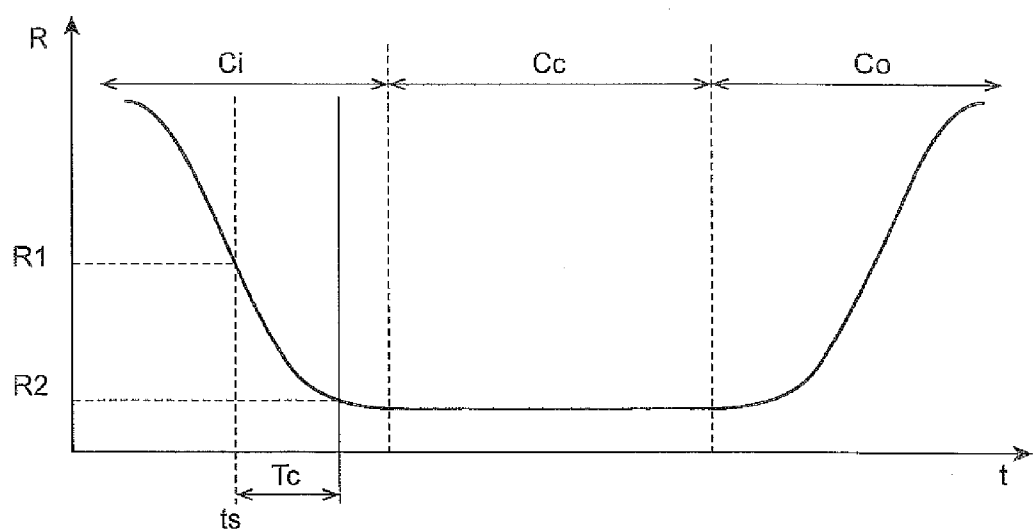
FIG. 3 is a diagram illustrating a method of setting a determination threshold value with respect to a steering occurring at an entrance section of a curved road.

FIG. 3 is a diagram illustrating a method of setting a determination threshold value with respect to the steering occurring at an entrance section Ci of the curved road. In FIG. 3, a case is assumed where the intentionally early steering is performed at the time before the radius of curvature R becomes sufficiently small at the entrance section Ci of the curved road (a section before arriving at the center section Cc of the curved road).

As illustrated in FIG. 3, at the time of steering ts at the entrance section Ci of the curved road, the radius R of curvature at the curved road is still decreasing and the value R1 is not sufficiently small yet. Accordingly, if the determination threshold value is determined based on the estimation value R1 of the radius of curvature at the time of steering ts, a relatively small determination threshold value, that is, a low steering speed, is set. Therefore, there is a case where an intentional sudden steering at the entrance section Ci of the curved road may be determined as the sudden steering associated with the driver's carelessness.

For this reason, the determination threshold value at the time of steering ts, among the estimation values R1 to R2 during the period from the time ts to the time ts+Tc, is set based on the estimation value smaller than the estimation value R1 at the time of steering, particularly based on the minimum estimation value R2 during the period. In this way, the determination threshold value is set as the relatively large threshold value, that is, the large steering speed based on the estimation value smaller than the estimation value R1 at the time of steering. Accordingly, the case where an intentional sudden steering at the entrance section Ci of the curved road is determined as the sudden steering associated with the driver's carelessness, can be suppressed.

Figure 4:
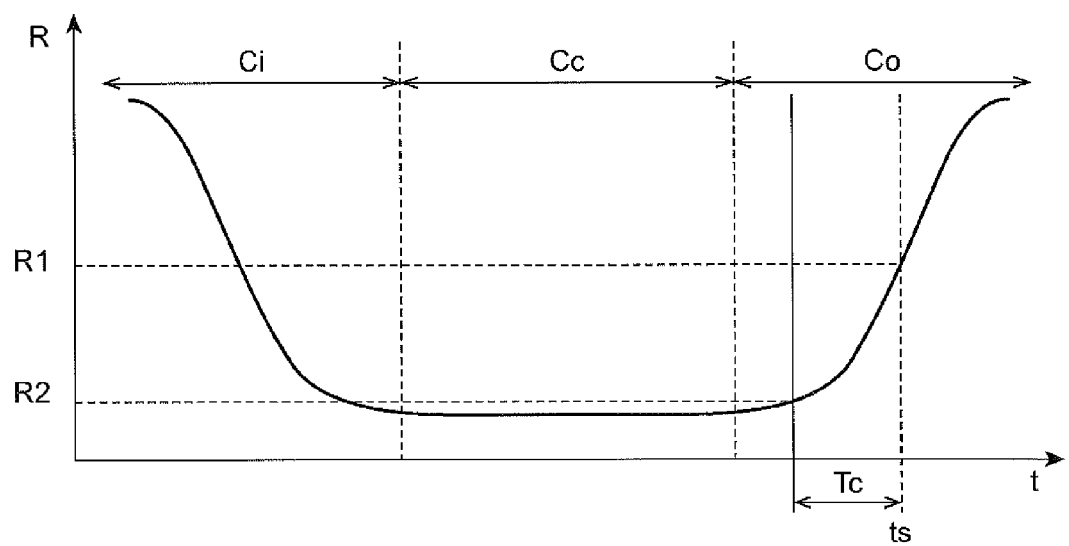
FIG. 4 is a diagram illustrating a method of setting a determination threshold value with respect to a steering occurring at an exit section of a curved road.

On the other hand, FIG. 4 is a diagram illustrating a method of setting the determination threshold value with respect to the steering occurring at the exit section Co of the curved road. In FIG. 4, a case is assumed where the intentionally slow steering is performed at the time after the radius of curvature R becomes sufficiently small at the exit section Co of the curved road (a section after passing the center section Cc of the curved road).

As illustrated in FIG. 4, at the time of steering ts at the exit section Co of the curved road, the radius R of curvature at the curved road is increasing already and the value R1 is not sufficiently small. Accordingly, if the determination threshold value is determined based on the estimation value R1 of the radius of curvature at the time of steering ts, a relatively small determination threshold value, that is, a low steering speed, is set. Therefore, there is a case where an intentional sudden steering at the exit section Co of the curved road may be determined as the sudden steering associated with the driver's carelessness.

For this reason, the determination threshold value at the time of steering, among the estimation values R1 to R2 during the period from the time ts−Tc to the time ts, is set based on the estimation value smaller than the estimation value R1 at the time of steering, particularly based on the minimum estimation value R2 during the period. In this way, the determination threshold value is set as the relatively large threshold value, that is, the large steering speed based on the estimation value smaller than the estimation value R1 at the time of steering. Therefore, there is a case where an intentional sudden steering at the exit section Co of the curved road may be determined as the sudden steering associated with the driver's carelessness.

Figure 5:
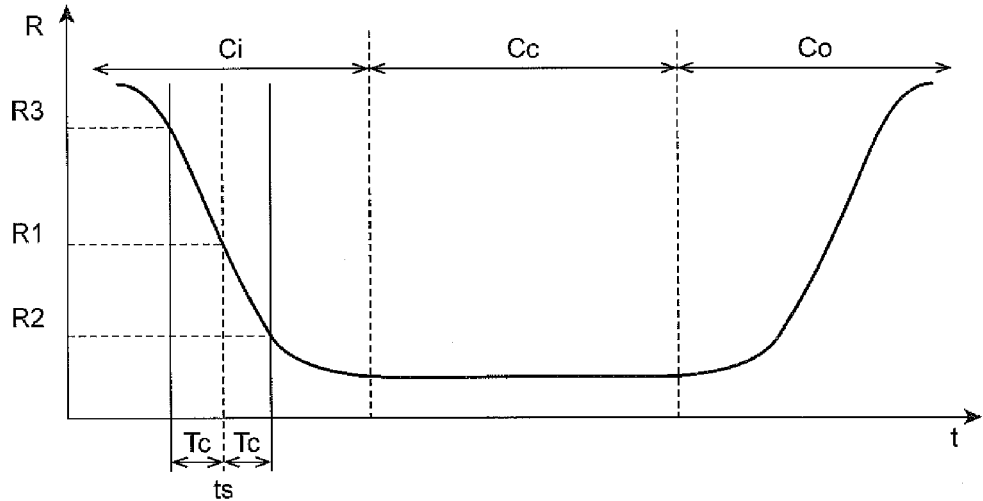
FIG. 5 is a diagram illustrating a method of setting a determination threshold value with respect to a steering regardless of the entrance section and the exit section of a curved road.
Figure 5:
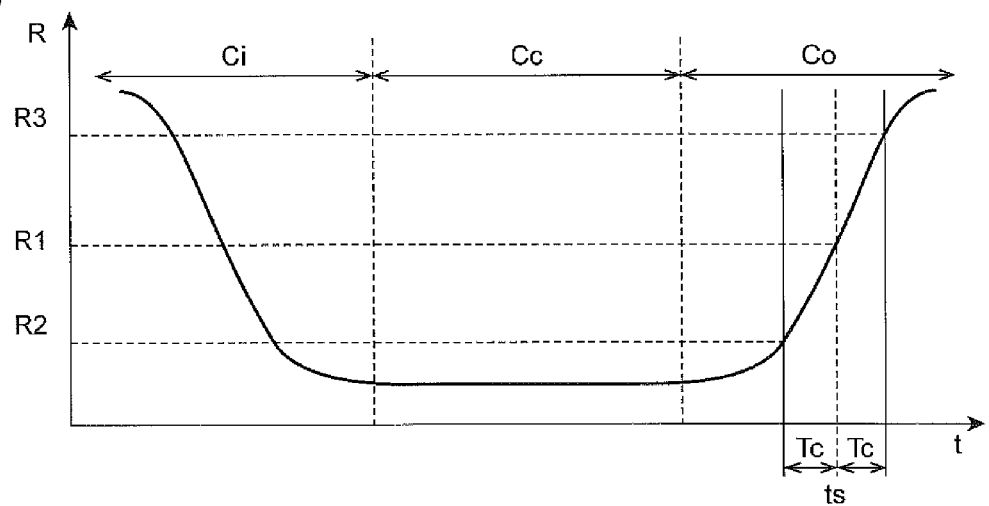

In addition, FIG. 5 is a diagram illustrating a method of setting the determination threshold value with respect to the steering regardless of the entrance section Ci and the exit section Co of the curved road. As illustrated in FIG. 5, the determination threshold value at the time of steering, among the estimation values R2 to R3 during the period from the time ts−Tc to the time ts+Tc, may be set based on the estimation value smaller than the estimation value R1 at the time of steering, particularly based on the minimum estimation value R2 during the period. In this way, the determination threshold value can appropriately be set based on the estimation value smaller than the estimation value R1 at the time of steering regardless of the case (a) of the entrance section Ci and the case (b) of the exit section Co of the curved road.

The determination threshold value at the time of steering in the section where the radius of curvature of the curved road is sufficiently small (the center section Cc of the curved road) may be set based on the estimation value at the time of steering. In addition, the determination threshold value at the time of steering on the straight road is set as a threshold value different from the determination threshold value at the time of steering on the curved road.

Alternatively, the determination threshold value may be set as a stepwise threshold value according to the estimation value of the curved state. For example, in a case where the curved state is expressed using the radius of curvature, if the estimation value of the radius of curvature is equal to or larger than a first threshold value, the determination threshold value is set as a threshold value th1 for the straight road. In addition, if the estimation value is smaller than a first threshold value and is equal to or larger than a second threshold value, the determination threshold value is set as a threshold value th2 for the straight road (th2>th1), and if the estimation value is smaller than the second threshold value and is equal to or larger than a third threshold value, the determination threshold value is set as a threshold value th3 for a sharp curve road (th3>th2). In this case also, each of the determination threshold values is set based on the estimation value smaller than the estimation value of the radius of curvature estimated at the time of steering.

Referring back to FIG. 2, when the determination threshold value at the time of steering is set in S14, the threshold value determination unit 24 determines whether or not the steering speed at the time of steering exceeds the determination threshold value (S15). The determination of steering speed may be performed only in a case where the steering speed exceeds the minimum threshold value (a minute steering which is clearly not a sudden steering).

Then, in a case where it is determined that the steering speed at the time of steering exceeds the determination threshold value, the warning control unit 25 actuates a warning through the warning device 14 (S16).

Here, the determination threshold value at the time of steering is set based on the curved state sharper than the curved state estimated at the time of steering as described above. For this reason, even in a case where it is determined that the steering occurs in the entrance section or the exit section of the curved road, the determination threshold value (which is relatively large) is set based on the curved state sharper than the curved state estimated at the time of steering. Accordingly, compared to the case of setting the determination threshold value based on the curved state estimated at the time of steering and determining the steering speed, it is possible to appropriately identify the sudden steering associated with the driver's carelessness and to actuate the warning.

As described above, according to the drive assist control device in the embodiment of the present invention, in a case where it is determined that the steering occurs after a steering wheel stationary state and the steering speed at the time of steering exceeds the determination threshold value which is set based on the curved state of the traveling road, a warning is actuated. Accordingly, compared to the case where the steering speed is determined based on the same determination threshold value on the straight road and the curved road, it is possible to appropriately identify the sudden steering associated with the driver's carelessness and to actuate a warning.

Here, the determination threshold value at the time of steering is set based on the curved state estimated during the period from the time of steering to the set time after the time of steering or a period from the set time before the time of steering to the time of steering and which is sharper than the curved state estimated at the time of steering. In this way, even in a case where it is determined that the steering occurs in the section where the curved state of the traveling road is relatively gradual (the entrance section or the exit section of the curved road), the determination threshold value (which is relatively large) is set based on the curved state sharper than the curved state estimated at the time of steering. Accordingly, compared to the case where the determination threshold value is set based on the curved state at the time of steering and the steering speed is determined, it is possible to appropriately identify the sudden steering associated with the driver's carelessness and to actuate the warning.

In addition, in a case where it is determined that the steering occurs, the threshold value setting unit 23 may set the determination threshold value at the time of steering based on the curved state estimated during a period from the set time before the time of steering to the set time after the time of steering and which is sharper than the curved state estimated at the time of steering. In this way, it is possible to appropriately set the determination threshold value regardless of the entrance section and the exit section of the curved road.

In addition, the threshold value setting unit 23 may set the determination threshold value at the time of steering based on the sharpest curved state estimated during the above-described period. In this way, compared to the case where the determination threshold value is set based on the curved state at the time of steering and the steering speed is determined, it is possible to appropriately identify the sudden steering associated with the driver's carelessness and to actuate the warning.

The embodiment described above is a best mode of the embodiment of the drive assist control device in the present invention, and the drive assist control device in the present invention is not limited to those described in the present embodiment. The drive assist control device in the present invention can be modified or be applied to another device without departing from the scope of the present invention described in each item of Claims.

In addition, the present invention can similarly be applied to a program for, according to the above-described methods, setting the determination threshold value based on the curved state estimated during a period from the time of steering to the set time after the time of steering or a period from the set time before the time of steering to the time of steering after the steering wheel stationary state and which is sharper than the curved state estimated at the time of steering, or to a computer readable recording medium that stores the program.

For example, in the description in the above embodiment, it is assumed that the curved state of the traveling road is estimated based on the detection value of the vehicle speed and the yaw rate. However, the curved state of the traveling road may be estimated by detecting the curved state of the white line on the traveling road using an image sensor, or may be estimated by acquiring linear information of the traveling road using a map information data base and a global positioning system (GPS) sensor or the like.

REFERENCE SIGNS LIST

11 steering angle sensor, 12 vehicle sensor, 13 yaw rate sensor, 14 warning device, 20 ECU, 21 steering determination unit, 22 curved state estimation unit, 23 threshold value setting unit, 24 threshold value determination unit, 25 warning control unit

The invention claimed is:

1. A drive assist control device, comprising:
 a steering determination unit that determines a steering state of a vehicle;
 a curved state estimation unit that estimates a curved state of a traveling road where the vehicle is traveling;
 a threshold value determination unit that, in a case where it is determined by the steering determination unit that a steering occurs after a steering wheel stationary state, sets a determination threshold value at a time of steering to be a value larger than a determination threshold value set based on a curved state estimated at the time of steering, based on the curved state estimated during a period from the time of steering to the set time after the time of steering or a period from the set time before the time of steering to the time of steering, the estimated curved state being sharper than the curved state estimated at the time of steering; and
 a warning control unit that actuates a warning in a case where the steering speed at the time of steering exceeds the determination threshold value.

2. The drive assist control device according to claim 1, wherein, in a case where it is determined that the steering occurs, the threshold value determination unit sets the determination threshold value at the time of steering based on the curved state estimated during a period from the set time before the time of steering to the set time after the time of steering and which is sharper than the curved state estimated at the time of steering.

3. The drive assist control device according to claim 2, wherein the threshold value determination unit sets the determination threshold value at the time of steering based on the sharpest curved state estimated during the period.

4. The drive assist control device according to claim 1, wherein the threshold value determination unit estimates a radius of curvature or curvature of the traveling road as the curved state of the traveling road.

* * * * *